May 7, 1963 W. R. FOX ET AL 3,088,446
COMBINED ENGINE ACCESSORY DRIVE AND HOUSING THEREFOR
Filed Jan. 12, 1960 4 Sheets-Sheet 1

INVENTORS
*William R. Fox, &*
BY *Harvey G. Humphries*

*E. E. James*
ATTORNEY

May 7, 1963 W. R. FOX ET AL 3,088,446
COMBINED ENGINE ACCESSORY DRIVE AND HOUSING THEREFOR
Filed Jan. 12, 1960 4 Sheets-Sheet 3

INVENTORS
William R. Fox, &
BY Harvey G. Humphries
E. E. James
ATTORNEY

United States Patent Office 3,088,446
Patented May 7, 1963

3,088,446
COMBINED ENGINE ACCESSORY DRIVE AND
HOUSING THEREFOR
William R. Fox, Wayne, and Harvey G. Humphries, Birmingham, Mich., assignors to General Motors Corporation, Detroit, Mich., a corporation of Delaware
Filed Jan. 12, 1960, Ser. No. 2,057
19 Claims. (Cl. 123—55)

This invention relates to an accessory drive system for an internal combustion engine; more particularly, to a combined blower, governor and fuel pump drive for a two-cycle engine; and with regard to certain more specific aspects thereof, to such an accessory drive particularly adapted for use on a two-cycle uniflow scavenged V-engine such as shown and described in copending United States patent application Serial No. 1,488 filed January 11, 1960, in the names of Harold H. Albinson, George P. Hanley, Kenneth L. Hulsing, Harvey G. Humphries and John J. May and entitled, "Two-Cycle Internal Combustion Engine."

The invention contemplates a compound accessory drive mechanism comprising a centrifugal governor and a fuel pump drivingly connected to the accessory drive gear train of the engine through a positive displacement rotary compressor and alignment and torque accommodating couplings. The rotating inertia mass of the blower drive gears and impellers serves to isolate the relatively delicate governor and fuel pump from the torsional shocks and vibration loads imposed on the accessory gear train. Such isolation of the governor and fuel pump permits use of a governor of relatively high speed sensitivity without undue governor hunting and substantially increases the life of the governor and fuel pump components. The invention further contemplates a compound housing for the several accessory drive components which is extremely compact, which is associated with the pressurized lubrication system of the engine to provide improved lubrication for the several components, which contributes substantial rigidity to the accessory drive mounting deck and thus to the overall rigidity of the engine cylinder block structure and which provides positive pressurized lubrication of the various bearing and gear engaged surfaces.

The foregoing and other objects, advantages and features of the invention will be more thoroughly understood from the following description of the several drawings in which.

Figure 1:
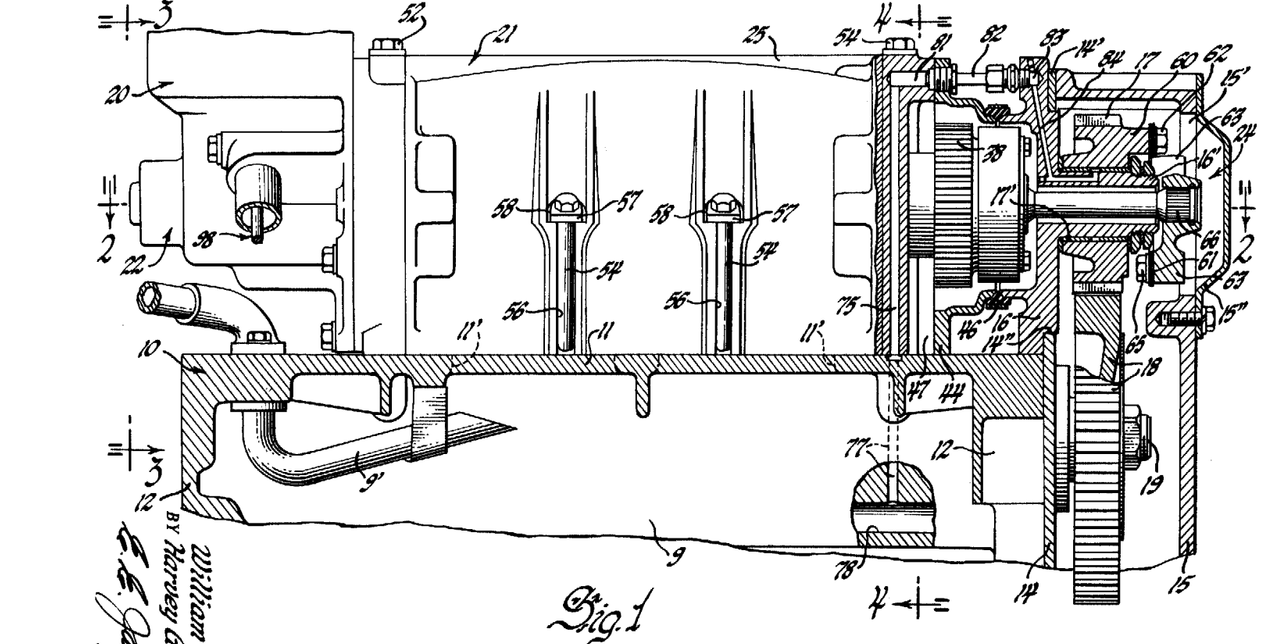
FIGURE 1 is a side elevational view showing a combined accessory drive unit which is illustrative of the invention and has portions thereof broken away and in section to show certain details of the drive unit as mounted and used on a V engine of the type described.
Figure 2:
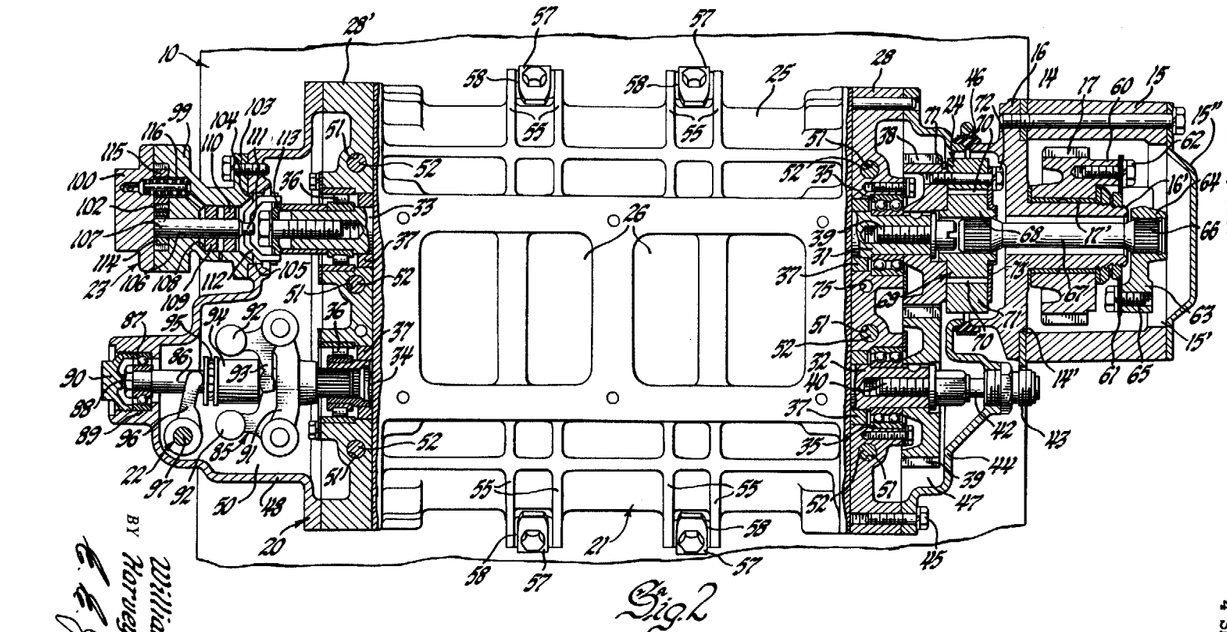
FIGURE 2 is a top elevational view of the accessory drive unit of FIGURE 1 with portions thereof broken away and in section substantially in the plane of the line 2—2 of FIGURE 1.
Figure 3:
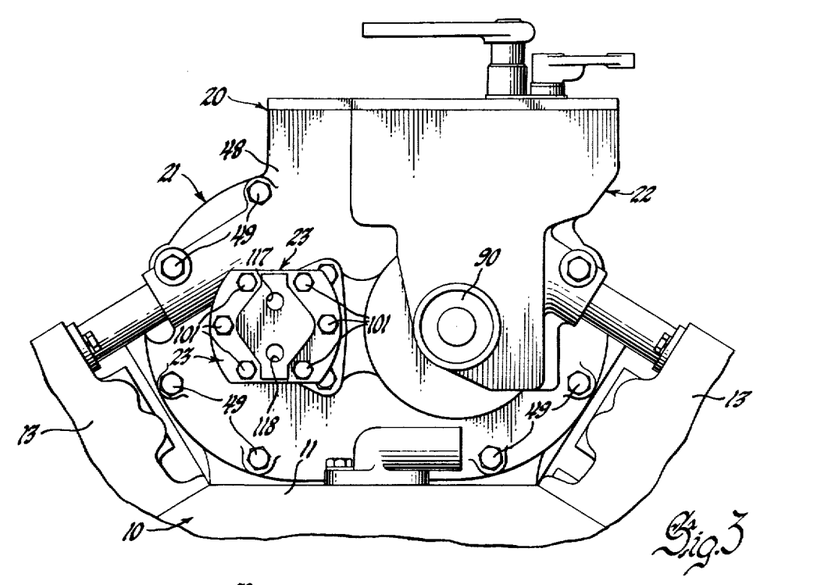
FIGURE 3 is a front elevational view taken substantially in the direction of the arrows 3—3 in FIGURE 1 and showing the mounting of the accessory drive unit intermediate the cylinder heads of a V engine of the type described.

Referring more particularly to FIGURES 1–4, a V-type two-cycle uniflow-scavenged internal combustion engine is indicated generally by the reference numeral 10. An air box 9 extends longitudinally of the engine and is defined between the cylinder banks, the blower mounting upper deck or wall 11 and end front and end rear walls 12 and 12' of the cylinder block 8. As shown in FIGURE 3, two cylinder heads 13 are mounted on the upper deck of the cylinder block and close the upper ends of the several inline V'd cylinders defined thereby.

An end plate 14 is secured to the rear end walls 12' and a portion thereof 14' projects upwardly beyond the upper deck of the engine. This projecting portion of the rear end plate 14 has an opening 14" extending therethrough. A gear housing member 15 having a corresponding peripheral configuration is secured to the rear end plate and to the rear end wall of the engine block to define a gear housing compartment for the accessory and timing gear drive of the engine. This cover member has an accessory gear access opening 15' which is axially aligned with the end plate opening 14" and normally closed by a suitable cover member 15". A flanged support member 16 is pilot mounted within the opening 14" and suitably secured thereto as shown. This member defines a hollow stub shaft portion 16' projecting into the gear housing compartment. A gear 17 is suitably journaled at 17' on the stub shaft 16' and drivingly engages one of two engine driven counter-rotating gears 18 which are drivingly secured to the rearwardly projecting ends of two camshafts 19. These camshafts are journaled in and extend longitudinally of the cylinder block immediately adjacent to and intermediate the inclined rows of V'd cylinders in accordance with the teaching of the aforementioned Albinson et al. patent application.

In accordance with the invention, a combined blower, governor and fuel pump accessory drive unit is mounted on the upper deck of the cylinder block intermediate the two cylinder banks and between the cylinder heads 13. This combined unit is designated generally by the reference numeral 20 and comprises a blower 21, a governor 22 and a gear-type fuel pump 23, all of which are drivingly connected to the accessory and timing gear drive of the engine through a drive coupling assembly indicated at 24.

The blower 21 includes a rotor housing 25 having air inlets at 26. A pressurized air outlet from the blower mates with and is connected to the engine air box 9 through ports 11' which are defined by and extend through the blower mounting deck of the engine block. A pressure take-off pipe 9' may be extended into the air box as shown immediately adjacent to and just below the blower discharge and the air box inlet ports 11'. Such air take-off may be used for first stage compression in an air pressure controlled system such as for air brakes or for a pneumatic suspension in vehicular installations. This location of the air take-off prevents ozone contamination in the take-off air. Identical and interchangeable end plates 28 and 28' are secured to the opposite ends of the rotor housing member 25 and cooperate therewith to define a rotor or impeller mounting chamber 29. Two cooperating three-lobed helical impellers 30 of Roots type cross-section are rotatably supported within each blower compartment and driven to provide pumping displacement of air from the compressor inlet to its pressure outlet and therefrom to the air box of the engine. Stub shafts 31, 32 and 33, 34 are carried by and project from opposite ends of each impeller 30. The stub shafts 31 and 32 are journaled in suitable double-row ball bearings 35 carried by the adjacent end plate 28. Suitable roller bearings 36 rotatably support the stub shafts with respect to the opposite end plate. Suitable oil and compression seals 37 are also interposed between the impellers and the journal bearings and seal the several stub shafts and their supporting end plates. The impellers 30 are synchronously driven with respect to each other by two timing gears 38 and 39 which are suitably splined or keyed on the ends of the stub shafts 31 and 32 and secured thereto by self-locking stud bolts 40 and 41.

A cover member 44 is pilot-doweled and secured to the end plate 28 by a plurality of bolts 45. This cover member is perforated to provide a flanged opening embracing elements of the drive 24. This flanged opening is sealed at 46 with respect to the mating flange formed on the gear mounting member 16. A lubricant receiving chamber 47 is thus defined which houses the impeller synchronizing gears. It will be noted that the gear securing bolt 41 also provides a driving connection for a tachometer drive shaft 42 which is journaled in a bushing 43 extending through and carried by the cover member 44 in axial alignment thereto. At the opposite blower end, a combined governor housing and end plate cover member 48 is secured to the front blower end plate 28' by a plurality of bolts 49 to define a lubricant receiving chamber 50. This chamber houses the governor 22 and the several driving connections intermediate the impellers and the governor and fuel pump. The cover member 48 further serves to mount the fuel pump 23.

The end plates 28 and 28' each have three spaced parallel bores 51 extending therethrough. Mounting bolts 52 are inserted through these bores and threadedly engage corresponding tapped holes 53 in the blower mounting deck 11 of the cylinder block. The bolts 52 provide the primary support of the combined blower, governor and fuel pump unit with respect to the cylinder block. These mounting bolts and the bolt hole defining bosses therefor also serve to structurally reinforce the end plates against deflection by the generated pressure. In addition to the mounting support provided by the end plates 28 and 28', the rotor housing 25 is clamped intermediate its ends to the mounting face of the block by obliquely inclined bolts 54. Parallel ribs 55 structurally reinforce and increase the cooling surface of the rotor housing. These ribs define grooves 56 in which the clamping bolts 54 extend obliquely inwardly between washer plates engaging angled shoulders 58 on opposite sides of the rotor housing and corresponding tapped holes 59 in the blower mounting deck of the block. It will be noted that this mounting reinforces the blower housing on its pressure discharge side and provides a rigid box structure which reinforces the upper blower mounting deck of the engine and thus provides increased rigidity to the overall engine structure.

As indicated above, the blower driving gear 17 is suitably journaled at 17' on the hollow stub shaft portion 16' of the end plate mounted member 16. This gear is provided with three equiangularly spaced radially extending bosses, one of which is shown at 60. Two annular spring plates 61 mate with the end faces of these bosses and are secured thereto by bolts 62. Intermediate the bolts 62, the spring plates 61 are secured equiangularly by bolts 65 to three arms 63 of a drive hub member 64. The drive hub member 64 is drivingly splined at 66 to the adjacent end of a quill shaft 65. The shaft 65 extends longitudinally through the hollow gear mounting stub shaft 16' and is drivingly splined at its opposite end to an elliptical cam member 68 of a spring loaded flexible coupling 69. The elliptical cam 68 is resiliently interposed between two leaf spring packs 70 which are carried in spaced parallel relation by a spring support member 71. The spring support member 71 is suitably secured to the adjacent blower synchronizing gear 38 by bolts 72, as shown. The bolts 72 also secure a retainer ring 73 to the spring support member 71. This ring serves to retain both the spring packs 70 and the driving cam 68 in their assembled driving positions within the flexible coupling 69.

The driving connection provided by the annular spring ring plates 61 accommodates angular misalignment and longitudinal tolerances between the blower and the blower driving gear 17. The spring loaded coupling 69 prevents the transfer of torque fluctuation between the blower driving gear and the blower. This spring drive arrangement contributes to the compactness of the overall compound accessory drive unit 20 and permits its mounting intermediate the cylinder heads of a V-type engine. This spring drive arrangement also provides needed accessibility for service and inspection to the flexible coupling provided by the spring rings 61. The central journaling of the blower drive gear 17 with respect to its mounting stub shaft also contributes to improved drive gear and bearing life over previous drive arrangements for such engines.

Figure 4:
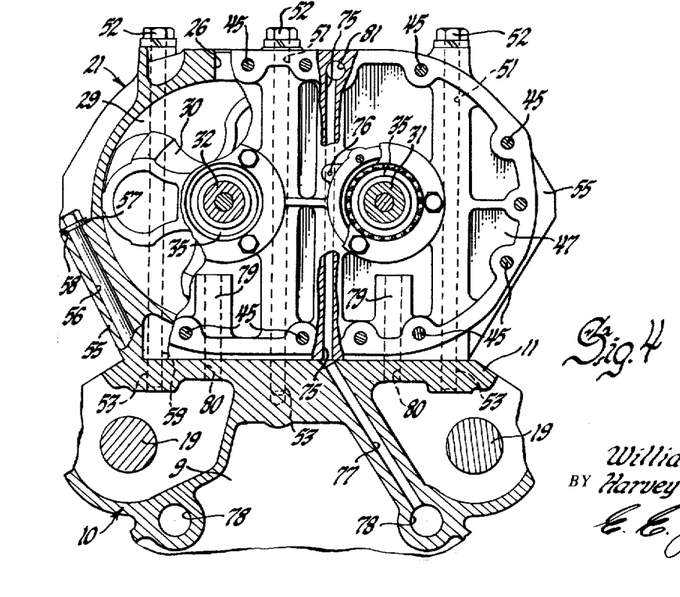
FIGURE 4 is a sectional view taken substantially in the plane of the line 4—4 in FIGURE 1 with certain portions thereof being further broken away to show certain additional details.

Lubricating oil for the various drive components is supplied through passages 75 which extend through each of the blower end plates in spaced parallel relation to the mounting bolts and their respective bosses. As best seen in FIGURES 1 and 4, the end plate passages 75 are connected through passages 77 in the cylinder block to oil distribution galleries 78 which extend longitudinally of the block in close parallel relation to the camshafts and are connected to the pressurized lubricating oil supply system of the engine. The oil thus supplied to the passages 75 is squirted through orifices 76 onto the face of the adjacent synchronizing gear 38 in the rear compartment 47 or toward the centrifugal flyweight assembly of the governor in the compartment 50. The orifice supplied oil collects in the several compartments or chambers 47 and 50 to a level controlled by upstanding outlet drains 79. These drain outlets are connected through ports 80 in the blower mounting deck 11 to the oil drain pockets which are formed in the camshaft mounting galleries intermediate the camshaft bearings and are connected therethrough to the engine oil sump. The oil level maintained by the outlet drains 79 results in limited immersion of the teeth of the synchronizing gears 38 and 39 thus supplementing the lubrication effected by the oil jet from the orifice 76.

The drain passages of the outlets 79 are each of a size capable of independently accommodating all of the oil supplied through the orifice 76. Thus, when the blower is in a horizontal position, both outlets drain oil from the blower end compartment and venting air is permitted to flow upwardly through each drain outlet centrally of the draining oil flow. Such flow tends to deaerate the oil as it passes into the adjacent camshaft gallery. When the engine and thus the blower are operating on an incline, the lower drain outlet maintains a gear tooth immersing oil level in the lower portion of the casing. At the same time, the upper outlet provides the air venting function. In certain applications, however, the engine may be normally mounted in an inclined position such as in certain marine or vehicular installations. To reduce the quantity of oil normally maintained in the blower end compartments in such applications, the lower drain outlet may be suitably lowered as by a drilled port intersecting the central drain passage thereof at the desired level. Adjacent the rear of the engine, the oil supply passage 75 of the end plate 28 terminates upwardly in a port 81 which faces the rear of the engine. A suitable connection 82 extends from the port 81 to a port 83 in the gear supporting member 16. The port 83 defines one end of an oil supply passage 84 which is connected at its distal end to supply oil to the journal bearing 17' supporting the blower driving gear 17.

The combined cover and governor housing member 48 is adapted to house either a limited speed, variable speed or constant speed centrifugal governor depending upon the centrifugal flyweight and speeder spring assembly used. Except for the mounting of the centrifugal flyweight assemblies and the driving connection provided therefor with respect to the adjacent impeller stub shaft, such governor details are not essential to the understanding of the instant invention. A preferred embodiment is shown and described in greater detail however, in copending United States Patent Application Serial No. 13,490, filed March 8, 1960, now Patent No. 3,014,475, in the names of Charles H. Frick, George P. Hanley and Frederick Schwartz and entitled "Control Mechanism for V-Type Internal Combustion Engine." For the purpose of illustrating the instant invention, a centrifugal assembly 85 of a limiting single speed governor is shown in FIGURE 2. This assembly includes a weight driving shaft 86 which is drivingly splined to and supported at one end by the impeller stub shaft 34. The opposite end of the shaft 86 is suitably journaled by a ball bearing assembly 87, the inner race of which embraces the end of the shaft and is retained thereon by a nut 88. The outer race of the bearing is carried by a counterbore 89 in the governor housing member and is retained therein by a pipe plug closure 90. A flyweight carrier 91 is secured to the shaft and pivotally mounts centrifugal weights 92. The centrifugal weights 92 are of bell crank configuration, each having a lever arm 93 extending radially inwardly of the weight pivotal mounting and thrustably engages the adjacent end of a riser sleeve 94 which is slidably mounted on the shaft 86. The opposite end of the riser sleeve 94 thrustably engages a ball bearing 95 which in turn engages the yoked arms of a power output lever 96 which is secured to a power shaft 97 intermediate its ends. The power output shaft 97 is biased in a fuel increasing direction by a suitable speeder spring assembly, not shown, in opposition to the centrifugal biasing action of the weights 92 and is connected through suitable linkages partially indicated at 98 to fuel injectors or other suitable fuel control means associated with the adjacent cylinder heads 13.

The fuel pump 23 comprises a pump housing consisting of a pump body member 99 and a cover member 100 which are secured together in sealed relation by suitable screws or bolts 101. These housing members define a pumping chamber 102 therebetween. The end of the valve body opposite the cover having a mounting flange 103 secured to the housing member 48 and a pilot boss 104 which is telescopically embraced by an opening 105 extending through the governor housing member 48 in axial alignment with the adjustment impeller stub shaft 33. A bore 106 extends axially through the body member 99 and journals a drive shaft 107 in axial alignment with the stub shaft 33. A counterbored recess 108 spacedly embracing the shaft 107 opens on the governor housing compartment and mounts two longitudinally spaced seals 109 and 110. The end of the shaft 107 projecting into the governor compartment 50 is provided with a square spline 111. This spline provides a driving connection with the hub of a yoked member 112. The arms of this yoked member drivingly engage radially extending slots formed in a drive disc or plate 113. The drive disc 113 is drivingly connected to the impeller stub shaft 33. This driving connection thus provides a universal driving connection intermediate the fuel pump shaft 107 and the impeller stub shaft 33 which is adapted to accommodate limited lateral and angular misalignment therebetween as well as longitudinal variations therebetween.

A driving impeller gear 114 is keyed to the opposite end of the shaft 107 within the pumping chamber and drivingly meshes with a driven impeller gear 115 which is journaled on a stationary sleeve shaft 116 which is mounted in spaced parallel relation to the drive shaft 107. The cover member 100 has inlet and outlet passages 117 and 118, respectively, extending therethrough and intersecting the pumping chamber 102 on opposite sides of the meshing engagement between the impellers. These passages are connectable through suitable piping, not shown, to the fuel reservoir and fuel distribution manifolds of the engine, respectively. As shown and described in greater detail in copending United States patent application Serial No. 17,398, filed March 24, 1960, in the names of James O. McVicar and Albert De Fezzy, and entitled, "Gear Pump and Relief Valve," the sleeve shaft 116 serves to mount a pressure relieving poppet type by-pass valve interconnecting the pressure outlet of the pump with the fuel inlet chamber.

Figure 5:
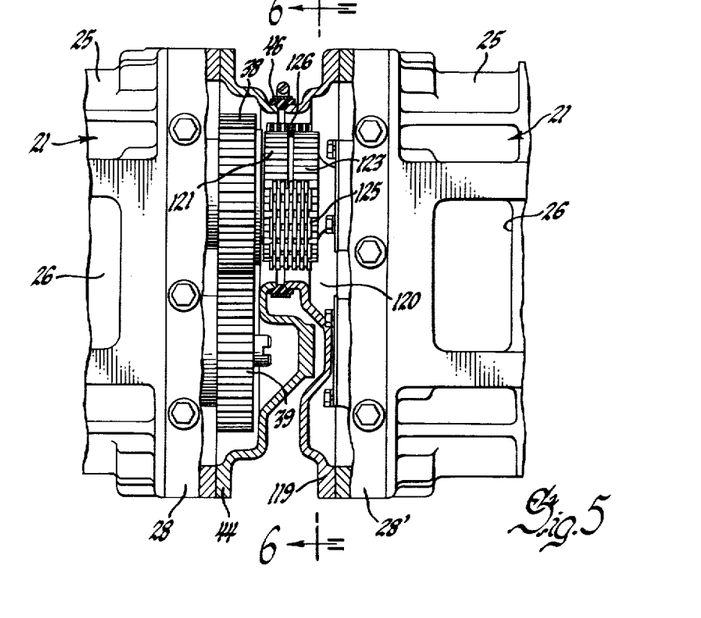
FIGURE 5 is a top elevational view with portions thereof broken away and showing a modified form of the invention wherein two of the blowers shown and described with reference to FIGURES 1–4 are drivingly interconnected.
Figure 6:
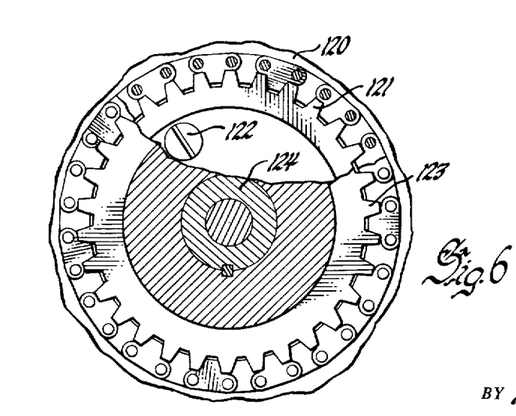
FIGURE 6 is a sectional view taken substantially in the plane of the line 6—6 of FIGURE 5 with additional portions thereof broken away to show certain details of construction.

The modification of the invention shown in FIGURES 5 and 6 is directed to a V engine installation wherein several of the blower units 21 might be required to supply the necessary scavenging and charging air requirements of the associated engine. As in the twelve-cylinder V engine shown in FIGURE 17 of the above-mentioned application Serial No. 1,488, two blowers 21 are shown mounted in closely spaced tandem relation. A cover member 44 identical with that previously described is secured to the rear end plate of the blower mounted adjacent the front of the engine. A second cover member 119 is secured to the forward end plate 28' of the rear blower and is perforated to provide a flange opening mating with the corresponding flanged opening of the cover member 44. These openings are sealed with respect to each other by a clamping ring 46 and define a closed oil receiving chamber 120. A sprocket hub 121 is secured to the end face of the front blower synchronizing gear 38 by a plurality of machine screws or bolts indicated at 122. The hub 121 is spaced slightly from a second sprocket hub 123 which is keyed to the adjacent impeller stub shaft 124 of the rear blower, the stub shaft 124 being identical to and interchangeable in assembly with the stub shafts 31 and 32 previously discussed. The two sprockets 121 and 123 are drivingly interconnected in assembly by a chain coupling 125. Certain median links 126 of this chain coupling extend radially inwardly between the sprockets to maintain the coupling in proper driving relation with respect to its mounting sprockets.

From the foregoing description of the several illustrative embodiments of the invention, it will be apparent to those skilled in the art that various modifications might be made therein without departing from the spirit and scope of the invention, as defined in the following claims.

We claim:

1. An accessory drive for an internal combustion engine comprising a positive displacement blower including two counterrotating impellers of substantial rotational inertial mass, centrifugal governor means drivingly connected to one end of one of said impellers and of limited rotational inertial mass relative to that of said impellers and particularly susceptible to variations in its driven speed, fuel circulating means of limited rotational inertial mass drivingly connected to the adjacent end of the other of said impellers, blower timing gear means associated with the opposite ends of said impellers to synchronously drive said impellers in phased relation to each other, an engine timing gear housing mountable at one end of the engine in closely spaced relation to the drive gear end of said blower, said timing gear housing having an opening therein in axial alignment with one of said blower gears, a closure member supported in said opening and having a hollow journal hub projecting therefrom into said timing gear housing, an engine-driven gear journaled on said journal hub within said timing gear housing, a first resilient drive means including a drive member flexibly secured to the end of said engine-driven gear opposite said closure member for angular and longitudinal movement with respect to the rotative axis of said engine-driven gear, a quill shaft drivingly splined at one end to said drive member and extending through said hollow journal hub in spaced relation thereto, and a second resilient drive means interposed between the other end of said quill shaft and said one blower gear and operable to isolate torsional fluctuations applied to said engine-driven gear from said blower, governor and fuel circulating means.

2. An accessory drive mountable on a V-type two-cycle internal combustion engine intermediate the V'd cylinder banks thereof, said drive comprising a housing means defining an intermediate blower chamber, a governor chamber at one end thereof and a drive mounting chamber at the opposite end thereof, a positive displacement rotary blower including two counterrotating impellers of substantial rotational inertial mass rotatably mounted in said blower chamber, a centrifugal governor means rotatably mounted within said governor chamber and coaxially and drivingly connected to the adjacent end of one of said impellers, said governor means being of limited rotational inertial mass relative to that of said impellers and particularly susceptible in its engine controlling function to variations in its driven speed, fuel circulating means of limited rotational inertial mass mounted on said governor chamber defining housing portion and drivingly connected to the adjacent end of the other of said impellers, timing gear means in said drive mounting chamber associated with the opposite ends of said impellers to synchronously drive said impellers in phased relation to each other, a gear housing mountable on the engine in closely spaced relation to the drive gear end of said blower, said gear housing having an opening therein in axial alignment with one of said blower gears, a closure member supported in said opening and sealed with respect to said drive mounting chamber of said housing means, said closure member having a hollow journal hub projecting therefrom into said gear housing, an engine-driven gear journaled on said journal hub within said gear housing, a first resilient drive means including a drive member flexibly secured to the end of said engine-driven gear opposite said closure member for angular and longitudinal movement with respect to the rotative axis of said driven gear, a quill shaft drivingly splined at one end to said drive member and extending through said hollow journal portion in spaced relation thereto, and a second resilient drive means interposed between the other end of said quill shaft and said one blower driving gear within said drive mounting chamber and operable to isolate torsional fluctuations of said engine-driven gear from said blower, governor and fuel circulating means.

3. An accessory drive mountable on a V-type two-cycle internal combustion engine intermediate the V'd cylinder banks thereof, said drive comprising a housing means defining a first drive mounting chamber at one end thereof, a first blower chamber adjacent said first drive mounting chamber, an intermediate drive mounting chamber, a second blower chamber, and a governor chamber at the end thereof opposite said first drive mounting chamber, a positive displacement rotary blower including two counterrotating impellers of substantial rotational inertial mass rotatably mounted in each of said blower chambers, a centrifugal governor means mounted in said governor chamber and coaxially and drivingly connected to the adjacent end of one of said impellers, said governor means having limited rotational inertial mass relative to that of said impellers and being connectible to fuel control means associated with the adjacent V'd cylinder banks and particularly susceptible in its fuel controlling operation to variations in its driven speed, fuel circulating means of limited rotational inertial mass mounted on said governor chamber-defining housing portion and drivingly connected to the end of the other adjacent impeller, timing gear means within each of said drive mounting chambers for synchronously driving the paired impellers within each of the blower chambers, means for drivingly interconnecting one of the timing gears in the intermediate drive mounting chamber with the first blower chamber impeller axially aligned therewith, an accessory drive gear housing mountable on one end of the engine in closely spaced relation to the drive gear end of the adjacent blower, said accessory drive gear housing having an opening therein in axial alignment with one of the blower timing gears in the adjacent drive housing chamber, a closure member supported in said opening and sealed with respect to said drive mounting chamber of said housing means, said closure member having a hollow journal hub projecting therefrom into said accessory drive gear housing, an engine-driven gear journaled on said journal hub within said accessory gear housing, a first resilient means including a drive member flexibly secured to the end of said engine-driven gear opposite said closure member for angular and longitudinal movement with respect to the rotative axis of said engine-driven gear, a quill shaft drivingly splined at one end to said drive member and extending through said hollow journal portion in spaced relation thereto, and a second resilient drive means interposed between the other end of said quill shaft and the blower driving gear adjacent said closure member and operable to damp and isolate torsional fluctuations applied to said engine driven gear from said blower, governor and fuel circulating means.

4. In an accessory drive mountable on a V-type two-cycle internal combustion engine intermediate the V'd cylinder banks of the engine including a positive displacement rotary blower including two counterrotating impellers of substantial rotational inertial mass, a centrifugal governor means coaxially and drivingly connected to the adjacent end of one of said impellers and having limited rotational inertial mass subject to variations in its driven speed, and fuel circulating means having limited inertial mass coaxially and drivingly connected to the adjacent end of the other of said impellers, timing gear means associated with the opposite ends of said impellers to synchronously drive said impellers in phased relation to each other, an accessory drive gear housing mountable on one end of the engine in closely spaced relation to the drive gear end of said blower, said accessory drive gear housing having an opening therein in axial alignment with one of said blower gears, a member mounted in said opening having a hollow journal hub projecting therefrom into said gear housing, an engine-driven gear journaled on said journal hub, a drive member flexibly secured to the end of said engine-driven gear opposite said journal hub member for angular and longitudinal movement with respect to the rotative axis of said engine-driven gear, a quill shaft drivingly splined at one end to said driving member and extending through said hollow journal hub in spaced relation thereto, and a second resilient drive means interposed between the other end of said quill shaft and said one blower driving gear and cooperating with the inertial masses of said blower impellers to damp and isolate torsional fluctuations applied to said engine-driven gear from said blower impellers and timing gear means and from the governor and fuel circulating means.

5. In an accessory drive as set forth in claim 2, said housing means including an intermediate blower chamber defining housing member having an air inlet port and an outlet port on opposite sides thereof, two inter-changeable end plates each having a peripheral flange secured to opposite axial ends of said intermediate housing member and a web portion defining one of the opposite end walls of said blower chamber, said end plates each having a plurality of parallel bosses reinforcing the web portions thereof and having bolt holes extending therethrough, said holes receiving bolts mounting said end plates to the engine, and said intermediate housing member having a plurality of paired closely spaced ribs extending externally thereof between the inlet and outlet port sides thereof, said paired ribs defining clamping shoulders intermediate their ends and being formed to receive obliquely inclined bolts between said paired ribs for securing the intermediate housing member to the engine, the inclined bolts being engageable with said clamping shoulders at one end and being threadably engageable with the engine at their opposite ends, and said bosses, ribs and bolts structurally reinforcing said housing members against elastic deformation on the discharge pressure sides when mounted on the engine.

6. In an accessory drive as set forth in claim 5, said housing means further including a first end cover member secured to one of said end plates and cooperating therewith to define said governor mounting chamber and a second cover member secured to and cooperating with the other of said end plates to define said drive mounting chamber.

7. In an accessory drive as set forth in claim 6, lubricant supply means including a passage in each of said end plates and having a passage intersecting orifice therein for directing a jet of supplied lubricant into said governor and drive mounting chambers.

8. In an accessory drive as set forth in claim 5, said housing means further including a first end cover member secured to one end plate and defining said governor mounting chamber therebetween, a second cover member secured to the other end plate and having an opening therein in juxtaposition to said gear housing closure member, and misalignment accommodating sealing means interconnecting said closure and second cover members to define said drive mounting chamber therebetween.

9. In an accessory drive as set forth in claim 3, said drive housing means including two axially spaced blower chamber defining members each having an air inlet port and an outlet port opening on opposite sides thereof, interchangeable end plates secured to opposite axial ends of each of said blower chamber members and defining opposite end walls of the blower chambers, said end plates each defining a plurality of bolt holes extending therethrough, said holes receiving bolts for mounting said end plates to the engine, said blower chamber members each having a plurality of paired closely spaced ribs extending externally thereof between the inlet and outlet port sides thereof, said paired ribs defining clamping shoulders intermediate the ends and being formed to receive obliquely inclined bolts between said paired ribs for securing the intermediate housing member to the engine, said inclined bolts engaging said clamping shoulders at one end threadably engageable with the engine at their opposite ends, and said ribs and bolts structurally reinforcing said blower chamber defining members against the elastic deformation on their discharge pressure sides.

10. In an accessory drive as set forth in claim 9, said housing means further including a first end cover member secured to the end plate distal from said gear housing and cooperating therewith to define said governor mounting chamber, a second cover member secured to the end plate adjacent said gear housing and having an opening therein in juxtaposition to said gear housing closure member, a first misalignment accommodating sealing means interconnecting said second cover and closure members and cooperating therewith to define said first drive mounting chamber, third and fourth cover members secured to the adjacent end plates intermediate the blower chamber members and having juxtapositioned openings therein embracing said drive connecting means, and a second misalignment accommodating sealing means interconnecting the openings in said third and fourth cover members and cooperating therewith to define said intermediate drive mounting chamber.

11. In an accessory drive as set forth in claim 3, said drive housing means including two axially spaced blower chamber defining members each having an air inlet port and an outlet port opening on opposite sides thereof, interchangeable end plates secured to opposite axial ends of each of said blower chamber members and defining opposite end walls of the blower chambers, a first cover member secured to the end plate adjacent said one engine end and having an opening therein in juxtaposition to said gear housing closure member, misalignment accommodating sealing means interconnecting said closure and first cover members and cooperating therewith to define said first drive mounting chamber, a second cover member secured to the end plate distal from said one engine end and cooperating therewith to define said governor mounting chamber, and misalignment accommodating housing means secured to and extending between the two adjacent end plate members intermediate the blower chamber members and cooperating therewith to define said intermediate drive mounting chamber.

12. In a V-type two-cycle internal combustion engine, an accessory drive mounted on the engine intermediate the V'd cylinder banks thereof, said drive comprising a housing means defining a first lubricant receiving and drive mounting chamber at one end thereof, a first blower chamber adjacent said first drive mounting chamber, a second intermediate lubricant receiving and drive mounting chamber, a second blower chamber, and a third lubricant receiving and drive mounting chamber at the end thereof opposite said first drive mounting chamber, a positive displacement rotary blower including two impellers of substantial rotational inertial mass counter rotatably mounted in each of said blower chambers, timing gear means in said first and second drive mounting chambers for synchronously driving the paired impellers in said blower chambers, drive connecting means in the intermediate drive mounting chamber for drivingly interconnecting one of the timing gears therein with the first blower chamber impeller aligned therewith and accommodating limited lateral and angular misalignment therebetween, an engine accessory drive gear housing secured to one end of said engine in closely spaced relation to the drive gear end of the adjacent blower, said accessory drive gear housing having an opening therein in axial alignment with one of the blower timing gears in the adjacent drive housing chamber, a closure member supported in said opening and sealed with respect to said drive mounting chamber of said housing means, said closure member having a hollow journal hub projecting therefrom into said accessory drive gear housing, an engine-driven gear journaled on said journal hub within said accessory gear housing, a first resilient means including a drive member flexibly secured to the end of said engine-driven gear opposite said closure member for angular and longitudinal movement with respect to the rotative axis of said engine-driven gear, a quill shaft drivingly splined at one end to said drive member and extending through said hollow journal portion in spaced relation thereto, and resilient drive means interposed between the other end of said quill shaft and the blower driving gear adjacent said closure member and operable to isolate torsional fluctuations applied to said engine-driven gear from the inertial mass of said blower driving gears and impellers.

13. In an internal combustion engine as set forth in claim 3, said drive housing means including two axially spaced blower chamber defining members each having an air inlet port and an outlet port opening on opposite sides thereof, end plates secured to opposite axial ends of each of said blower chamber members and defining opposite end walls of the blower chambers, a first end cover member secured to the end plate adjacent said one engine end and having an opening therein in juxtaposition to said gear housing closure member, misalignment accommodating sealing means interconnecting said closure and first cover members and cooperating therewith to define said first lubricant receiving drive mounting chamber, misalignment accommodating housing means secured to and extending between the two adjacent end plate members intermediate the blower chamber members and cooperating therewith to define said intermediate lubricant receiving drive mounting chamber, and a second end cover member secured to the end plate distal from said one engine end and cooperating therewith to define said third lubricant receiving drive mounting chamber.

14. In a V-type two-cycle internal combustion engine having a gear housing and an engine-driven gear train mounted on one end thereof and having a pressurized air receiving chamber extending intermediate the V'd cylinder banks, an accessory drive mounted on the air chamber defining portion of the engine and including a positive displacement blower comprising a pair of lobed impellers of substantial rotational inertial mass and a housing defining a pumping chamber and rotatably mounting said impellers therein, said housing including an intermediate housing member having an air inlet port and an air chamber connectable outlet port on opposite sides thereof and two interchangeable end plates secured to said intermediate housing member and defining opposite end walls of the pumping chamber, bolts extending through and securing said end plates to said engine, a first end cover member secured to the end plate distal from the engine gear housing and defining a governor mounting chamber therebetween, a centrifugal governor and means rotatably mounted within said governor chamber and drivingly connected to the adjacent end of one of said impellers, said governor means having limited rotational inertial mass relative to said impellers and being susceptible in its engine controlling operation to variations in its driven speed, a fuel circulating means of a limited rotational inertial mass mounted on said first end cover member and drivingly connected to the adjacent end of the other of said impellers, timing gears carried by the opposite ends of said impellers and enmeshed to synchronously counterrotate said impellers in phased relation to each other, said gear housing having an opening therein in axial alignment with one of said blower gears, a closure member mounted in said opening and having a hollow journal hub projecting into said gear housing, a second end cover member secured to the end plate adjacent the gear housing and having an opening therein in juxtaposition to said closure member, misalignment accommodating means interconnecting said closure and second cover members and cooperating therewith to define a drive mounting chamber, said engine driven gear train including a gear journaled on said closure hub, a first resilient drive means including a drive member flexibly secured to the end of said engine driven gear opposite said closure member for angular and axial movement with respect thereto, a quill shaft drivingly splined at one end to said drive member and extending through said hollow hub in spaced relation thereto, and a second resilient drive means interposed between the other end of said quill shaft and said one blower driving gear and cooperating with the inertial masses of the blower impellers to damp and isolate torsional fluctuations of said engine driven gear train from said blower impellers and timing gears and from said governor and fuel circulating means.

15. In a V-type two-cycle internal combustion engine having a gear housing and an engine-driven gear train mounted on one end thereof and having a pressurized air receiving chamber extending intermediate the V'd cylinder banks, an accessory drive mounted on the air chamber defining portion of the engine and including a positive displacement blower comprising a pair of intermeshed lobed impellers of substantial rotational inertial mass and a housing defining a pumping chamber and rotatably mounting said impellers therein, said housing including an intermediate housing member having an air inlet port and an air chamber connectible outlet port on opposite sides thereof and two interchangeable end plates secured to said intermediate housing member and defining opposite end walls of the pumping chamber, said end plates each having a plurality of parallel bosses reinforcing the web portions thereof and having bolt holes extending therethrough, said holes receiving bolts mounting said end plates to said engine, said intermediate housing member having a plurality of paired closely spaced ribs extending externally thereof between the inlet and outlet port sides thereof, said paired ribs defining clamping shoulders intermediate the ends thereof, obliquely inclined bolts extending between said paired ribs and engaging said clamping shoulders at one end and being secured to the engine at their opposite ends thereby securing said intermediate housing member to the engine, said bolt hole bosses and paired ribs and said bolts structurally reinforcing said housing members against the elastic deformation on the discharge pressure side thereof, a first end cover member secured to the end plate distal from the engine gear housing and defining a governor mounting chamber therebetween, a centrifugal governor means coaxially mounted in said governor chamber and drivingly connected to the adjacent end of one of said impellers, said governor means having limited rotational inertial mass substantially less than that of said impellers and being susceptible in its engine controlling operation to variations in its driven speed, a fuel circulating means of limited rotational inertial mass mounted on said first end cover member and drivingly connected to the adjacent end of the other of said impellers, timing gears carried by the opposite ends of said impellers and enmeshed to synchronously counterrotate said impellers in phased relation to each other, said gear housing having an opening therein in axial alignment with one of said blower gears, a closure member mounted in said opening and having a hollow journal hub projecting into said gear housing, a second end cover member secured to the end plate adjacent the gear housing and having an opening therein in juxtaposition to said closure member, misalignment accommodating means interconnecting said closure and second cover members and cooperating therewith to define a drive mounting chamber, said engine driven gear train including a gear journaled on said closure hub, a first resilient drive means including a drive member flexibly secured to the end of said engine driven gear opposite said closure member for angular and axial movement with respect thereto, a quill shaft drivingly splined at one end to said drive member and extending through said hollow hub in spaced relation thereto, and a second resilient drive means interposed between the other end of said quill shaft and said one blower driving gear and cooperating with the inertial masses of said impellers to damp and isolate torsional fluctuations of said engine driven gear train from said blower impellers and timing gears and from the governor and fuel circulating means.

16. In an internal combustion engine having a pressurized air receiving chamber extending longitudinally thereof, a gear housing and an engine-driven gear train mounted on one end of the engine, a positive displacement blower mounted on an air chamber defining portion of the engine and comprising a pump chamber defining housing rotatably mounting a pair of intermeshed lobed impellers of substantial rotational inertial mass, timing gears carried by the ends of said impellers adjacent said gear housing and enmeshed to synchronously counterrotate said impellers in phased air pumping relation to each other, said gear housing having an opening therein in axial alignment with one of said blower gears, a closure member mounted in said opening and having a hollow journal hub projecting into said gear housing, an end cover member secured to the end of said blower housing adjacent the gear housing and having an opening therein in juxtaposition to said closure member, misalignment accommodating means interconnecting said closure and second cover members and cooperating therewith to define a drive mounting chamber, an engine gear train driven gear journaled on said closure hub, a first resilient drive means including a quill shaft flexibly secured at one end to said engine driven gear for angular and axial movement with respect thereto and extending through said hollow hub in spaced relation thereto, and a second resilient drive means interconnecting the other end of said quill shaft and said one blower driving gear and cooperating with the inertial masses of said impellers to damp and isolate torsional fluctuations of said engine driven gear train from said blower impellers and timing gears.

17. In an internal combustion engine, an accessory drive comprising a positive displacement blower including two intermeshed impellers of substantial rotational inertial mass, centrifugal governor means drivingly connected to one end of one of said impellers, said governor means being of limited rotational inertial mass relative to said impellers and susceptible in its engine controlling operation to variations in its driven speed, and fuel circulating means of limited rotational inertial mass drivingly connected to the adjacent end of the other of said impellers, timing gears carried by the opposite ends of said impellers and enmeshed to synchronously drive said impellers in phased counterrotating relation to each other, a gear housing secured to one end of said engine, an engine-driven gear train mounted within said gear housing, the drive gear end of said blower being in closely spaced relation to said gear housing, said gear housing having an opening therein in axial alignment with one of said blower gears, a closure member supported in said opening and having a hollow journal hub projecting therefrom into said gear housing, said engine driven gear train including a gear journaled on said journal hub, a first resilient drive means including a drive member flexibly secured to the end of said engine driven gear opposite said closure member for angular and longitudinal movement with respect thereto, a quill shaft drivingly splined at one end to said drive member and extending through said hollow journal hub in spaced relation thereto, and a second resilient drive means interposed between the other end of said quill shaft and said one blower driving gear and cooperating with the inertial masses of said impellers to damp and isolate torsional fluctuations of said engine driven gear train from said blower impellers and timing gears and from the governor and fuel circulating means.

18. An accessory drive mountable on and substantially within the dimensional outline of an internal combustion engine and including a primary engine accessory having substantial rotational inertial mass and a secondary engine accessory drivingly connected for rotation by said primary accessory, said secondary accessory being of limited rotational inertial mass and particularly susceptible in its operation to variations in its driven speed, said primary accessory having a rotatably driven input member, a gear housing mountable on the engine and having an opening therein in closely spaced axial alignment with the driven input member of said primary accessory, a closure member supported in said housing opening and having a hollow journal hub projecting into said gear housing, an engine-driven gear journaled on said journal hub within said housing, a first resilient drive means including a drive member flexibly secured to the end of said gear opposite said closure member to accommodate angular and longitudinal movement with respect to the rotative axis of said engine-driven gear, a quill shaft drivingly splined at one end to said drive member and extending through said hollow journal hub in spaced relation thereto, and a second resilient drive means interposed between the other end of said quill shaft and the driven input member of said accessory and operable to isolate torsional fluctuations imposed on said engine driven gear from the rotatably-driven inertial masses of said primary and secondary accessories.

19. In an accessory drive mountable on an internal combustion engine including a blower having substantial rotational inertial mass and an engine governor drivingly connected for rotation by said blower, said engine governor being of limited inertial mass and particularly susceptible in its operation to variations in its driven speed, said blower having a rotatably driven input member, a gear housing mountable on the engine and having an opening therein in closely spaced axial alignment with the driven input member of said blower, a closure member supported in said housing opening and having a hollow journal hub projecting into said gear housing, an engine-driven gear journaled on said journal hub within said housing, a first resilient drive means including a drive member flexibly secured to the end of said gear opposite said closure member to accommodate angular and longitudinal movement with respect to the rotative axis of said engine-driven gear, a quill shaft drivingly splined at one end to said drive member and extending through said hollow journal hub in spaced relation thereto, and a second resilient drive means interposed between the other end of said quill shaft and the driven input member of said accessory and cooperating with the inertial mass of said blower to isolate engine torsional speed fluctuations imposed on said engine driven gear from said governor.

References Cited in the file of this patent

UNITED STATES PATENTS

| | | |
|---|---|---|
| 1,031,245 | Chapin | July 2, 1912 |
| 1,472,012 | Leblanc | Oct. 23, 1923 |
| 1,729,509 | Fedden | Sept. 24, 1929 |
| 1,878,210 | Vincent | Sept. 20, 1932 |
| 1,955,799 | Fielden | Apr. 24, 1934 |
| 2,035,096 | Schneider | Mar. 24, 1936 |
| 2,057,062 | Schneider | Oct. 13, 1936 |
| 2,265,677 | Straub | Dec. 9, 1941 |
| 2,303,714 | Wydler | Dec. 1, 1942 |
| 2,678,037 | Wiegman | May 11, 1954 |
| 2,879,758 | Scheiterlein | Mar. 31, 1959 |
| 2,963,006 | Karde | Dec. 6, 1960 |

FOREIGN PATENTS

| | | |
|---|---|---|
| 327,500 | Italy | July 13, 1935 |

UNITED STATES PATENT OFFICE
CERTIFICATE OF CORRECTION

Patent No. 3,088,446                         May 7, 1963

William R. Fox et al.

It is hereby certified that error appears in the above numbered patent requiring correction and that the said Letters Patent should read as corrected below.

Column 11, line 16, strike out "and".

Signed and sealed this 7th day of April 1964.

(SEAL)
Attest:

ERNEST W. SWIDER
Attesting Officer

EDWARD J. BRENNER

Commissioner of Patents